May 19, 1953  E. P. COOMBS  2,639,131
DIFFUSER FOR GASES
Filed Oct. 27, 1949  3 Sheets-Sheet 2
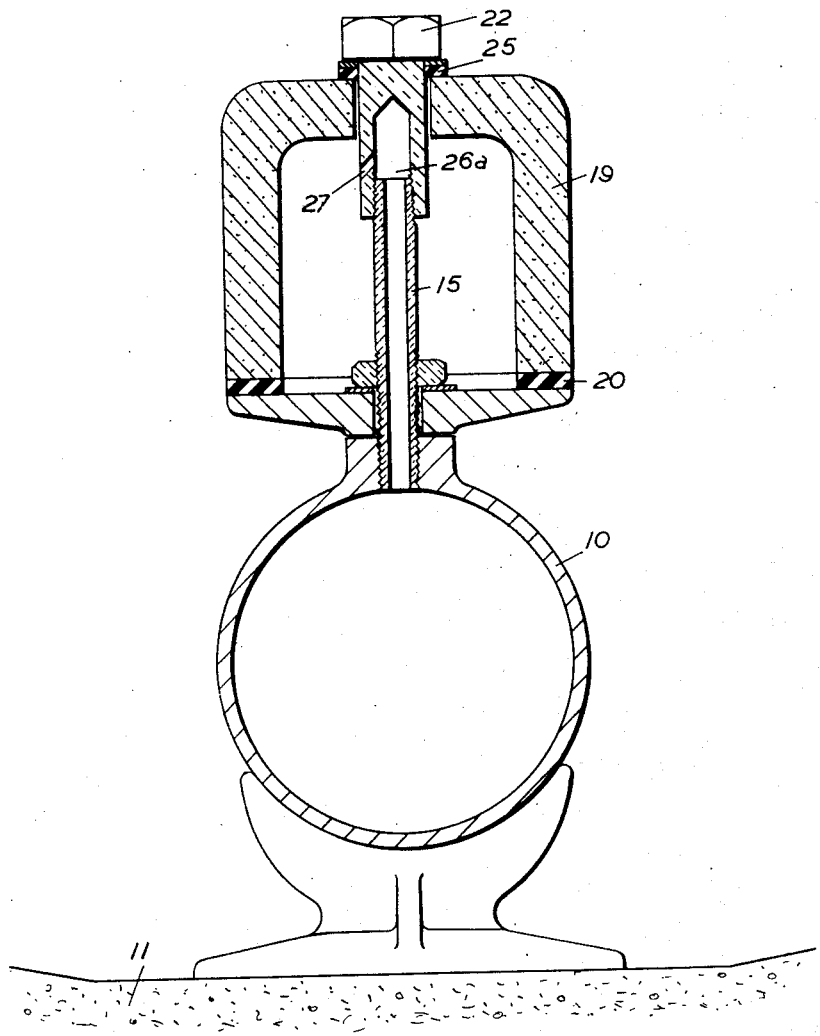
Inventor
Eric P. Coombs
By
Attorney May 19, 1953   E. P. COOMBS   2,639,131
DIFFUSER FOR GASES
Filed Oct. 27, 1949   3 Sheets-Sheet 3
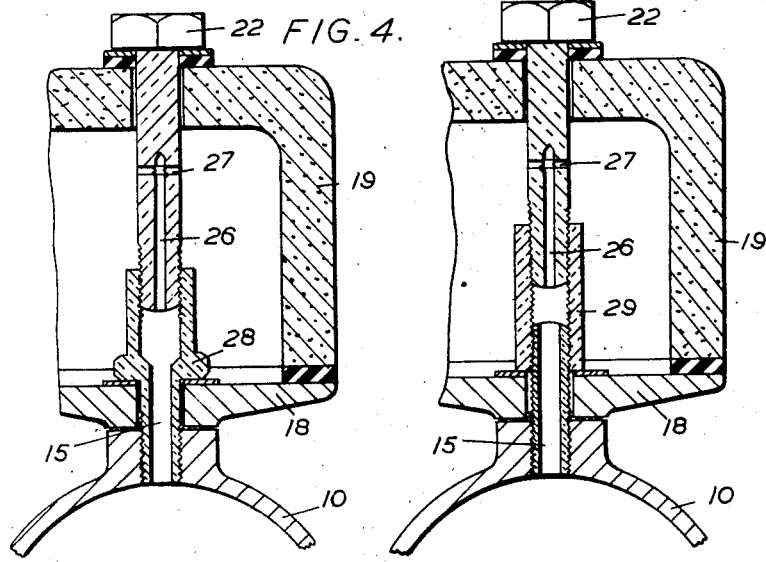
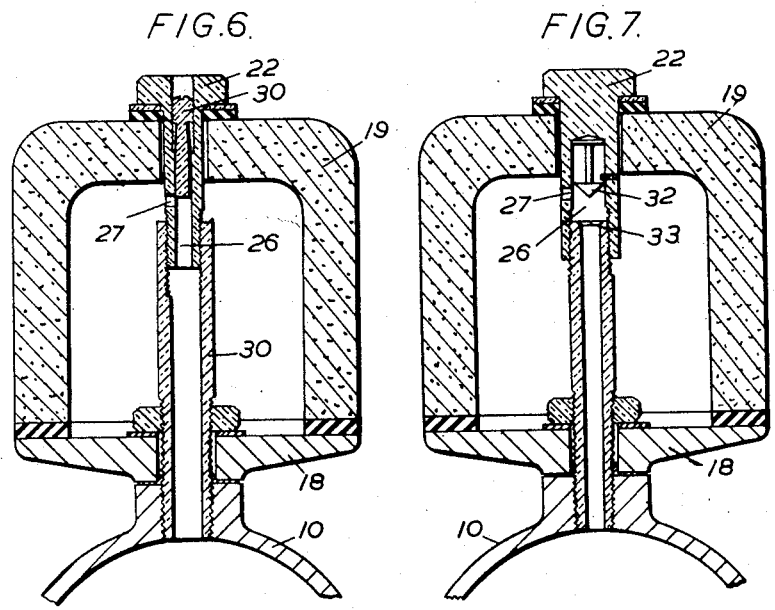
Inventor
Eric P. Coombs
By
Attorney

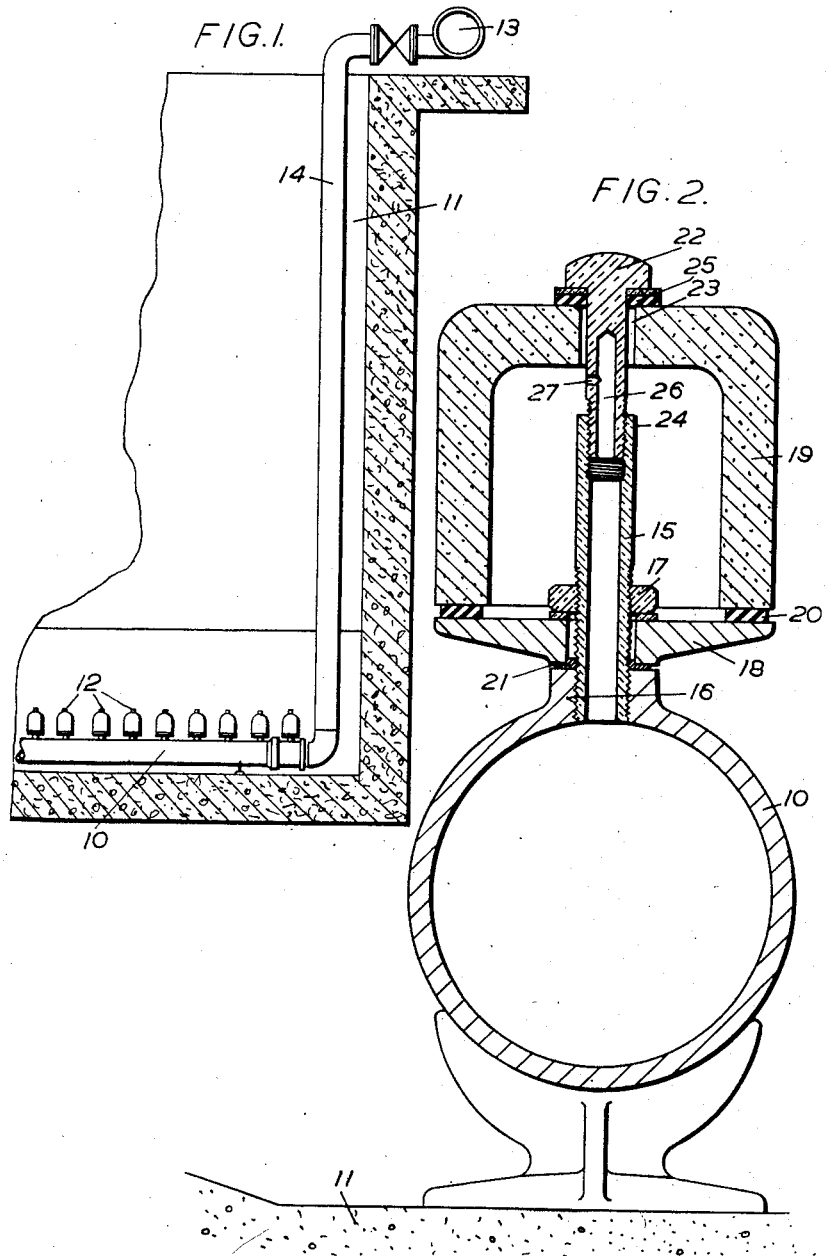

UNITED STATES PATENT OFFICE 2,639,131

DIFFUSER FOR GASES

Eric Procter Coombs, Finchley, London, England, assignor to Activated Sludge Limited, London, England, a British company Application October 27, 1949, Serial No. 123,889
In Great Britain November 19, 1948

3 Claims. (Cl. 261—122)

This invention is for improvements in or relating to means, hereinafter called diffusers, for diffusing gases into liquids. Diffusers of this character are generally of porous stone or like material and are used extensively, for example, for diffusing air into sewage in the activated sludge process of sewage purification and the present invention is particularly concerned with improvements in or relating to diffusers for use in the purification of sewage by the activated sludge process.

In the specification of our British Patent No. 605,046 there is described and claimed a dome-shaped diffuser having porous walls and adapted to be mounted over an orifice in an air supply main or conduit so that the dome receives air which is diffused through its walls in small bubbles into sewage or other liquid to be treated, the dome or a plurality of domes mounted, for example, along a common air supply pipe or channel, being located at or towards the lower part of a treatment tank.

In using dome-shaped and like diffusers it is necessary periodically to clean the orifice through which the dome is supplied with air from the air main or conduit. This orifice is usually relatively small, and if the air is not free from dust particles it may become partially choked after some months of operation of the diffuser. It is inconvenient to have to remove the dome to do this because the domes themselves generally only require cleaning after long periods of use, e. g., of the order of every five years, whereas it may be advantageous to clean the air supply orifice every six months. An object of the present invention is to provide an arrangement in diffusers of the dome or like kind which facilitates cleaning of the aforementioned air supply orifice and does not entail removal of the dome itself. It will be appreciated that it is of great advantage, from the time and labour saving point of view, not to have to remove the dome because this is jointed down and some time is occupied in removing and re-setting it. By making provision for quick and easy cleaning of the inlet tube and air orifice, even or fairly even air diffusion can be maintained over substantially the whole surface of the tanks, thus improving the efficiency of the aeration plant.

According to the present invention there is provided a diffuser comprising a dome or other hollow body which encloses a part having an orifice through which air is supplied to the dome or hollow body for diffusion through the porous walls thereof, wherein said orifice is in a part removable from the exterior of the dome or hollow body whereby said orifice can readily be cleaned.

A preferred arrangement, when applying the invention to dome-shaped or like diffusers, is to provide the air discharge orifice in a screw-device for holding down or clamping the dome onto an air supply main or conduit. The orifice can then be cleaned simply by removing the holding-down screw and this can be effected without breaking the joint between the dome and the air supply main or conduit.

Some specific embodiments of the present invention will now be described, by way of example, as applied to dome-shaped diffusers for use in the aeration of sewage. In the following description a reference is made to the accompanying drawings whereon—

Figure 1 is a diagrammatic, fragmentary sectional elevation through the aeration tank of a sewage plant and shows the manner in which a series of diffuser domes are located on the floor of the tank, Figure 2 is a detail transverse cross-sectional view through the diffuser pipe and one of the dome diffusers mounted thereon, Figure 3 is a fragmentary transverse cross-sectional view through a further embodiment of the dome diffuser, Figure 4 is a fragmentary transverse sectional view through a still further form of the dome diffuser, Figure 5 is a still further transverse cross-sectional view of another form of the dome diffuser, Figure 6 is a transverse cross-sectional view through an embodiment of the dome diffuser which incorporates an air regulating device and an air filter, and Figure 7 is a transverse cross-sectional view through an embodiment of the dome diffuser which incorporates a non-return valve.

Briefly, the aeration tank shown in Figure 1 comprises a tank proper 11 in the lower part of which the air diffuser apparatus is located.

The latter comprises a diffuser pipe 10 along the length of which are mounted at spaced intervals a series of dome diffusers 12 which are supplied with air from the diffuser pipe. The air supply to the diffuser pipe itself is taken from an air main 13 by way of a down-take pipe 14.

The dome diffuser device shown in Figure 2 comprises a tubular stem 15 screwed into an air outlet 16 in the diffuser pipe 10 there being, of course, several such outlets spaced apart along the pipe, one for each dome device. The stem 15 has a nut 17 on its lower end which serves to secure a base plate 18 to the diffuser pipe 10. A dome proper, of porous material, e. g. Alundum, 19 is mounted on the base plate 18, the tubular stem 15 projecting up into the interior of the dome. A sealing gasket 20 is provided between the base of the dome 19 and the base plate 18 and a sealing washer 21 is located between the base plate and the diffuser pipe 10 so as to prevent the discharge of air except via the porous walls of the dome. The dome 19 is clamped down on to its base plate 18 by means of a screw 22 having, for example, a square or hexagonal head. The screw 22 passes through a hole 23 in the top or crown of the dome and is screwed into an internally threaded upper portion 24 of the tubular stem 15. The latter, it will be noticed, terminates some distance short of the top interior surface of the dome. A sealing washer 25 is provided between the head of the screw 22 and the top of the dome so as to prevent leakage of air via the hole 23. The dome securing screw 22 is bored axially as indicated at 26 for a substantial portion of its length and one or more lateral ports or orifice 27 is or are provided in the screw. These ports communicate with the axial bore 26 above the upper end of the tubular stem 15. The air from the diffuser pipe 10 flows by way of the tubular stem 15, which has a bore of substantial diameter, and into the interior of the dome 19 by the said orifice or ports 27 in the dome securing screw 22. The port or ports 27 is or are of relatively small dimensions because it is necessary to restrict, to some extent, the amount of air passing to each of the domes mounted along the diffuser pipe 10 so that all the domes get a substantial and approximately equal proportion of the air. To relieve a choked orifice or port 27 in the arrangement just described it is only necessary to withdraw the dome securing screw 22 and then clean out the orifice in it with, for example, a piece of wire or a small brush. This can be done quickly and without in any way disturbing the jointing down of the dome on to its base plate. At the same time a brush or the like can be used to clean out the axial bore of the screw 26 and the bore of the tubular stem 15.

The embodiment of the invention shown in Figure 3 is similar to that just described with reference to Figure 2 and like reference numerals have been used to indicate like parts. In this embodiment, however, the holding-down screw 22 for the dome 19 has a shank in the form of an internally screw-threaded sleeve as indicated at 26a which screws on to the upper externally threaded end of the tubular stem 15 so as to clamp down the dome. The sleeve or hollow shank 26a of the screw 22 has a small lateral port or orifice 27, which is inclined downwardly, through which the air is discharged into the interior of the dome. This orifice can easily be cleaned as before by removing the screw 22.

In the embodiment of the invention shown in Figure 4, the tubular stem 15, which is screwed into the diffuser pipe 10, is relatively short and receives the lower end of a long dome securing screw 22 which is provided with an axial bore 26 and lateral ports 27 of small diameter for the discharge of air into the dome. In this embodiment of the invention the tubular stem 15 has an integral collar or flange 28 between its ends which bears on the base plate 18 to clamp it to the main air supply.

In the embodiment of the invention shown in Figure 5, the tubular stem 15 is provided within the dome with an internally screw-threaded sleeve or tall nut 29 which is screwed on to the stem 15 so as to clamp down the base plate 13. At its upper end the sleeve 29 receives a screw-threaded end of the dome securing screw 22, the shank of said screw being bored axially at 26 and provided with lateral ports 27 for the discharge of air into the interior of the dome in a similar manner to that previously described.

In the embodiment of the invention shown in Figure 6, the axial bore 26 in the dome securing screw 22 extends right through said screw and is tapped to receive a screw-threaded member 30 somewhat like a grub screw. By adjusting the grub screw 30 up or down in the screw 22 the lateral ports 27 may be more or less restricted and this provides for regulation of the amount of air passing to the interior of the dome. It may, in this embodiment of the invention, be of advantage to make the ports or orifice 27 in the form of a vertically extended slot.

In the still further embodiment of the invention shown in Figure 7, the axial bore 26 in the dome securing screw 22 is relatively large although the lateral port or ports 27 is or are restricted in size as before. The bore 26 houses a non-return valve 32 adapted to permit the discharge of air into the dome but, by seating itself on a seating 33 provided by the upper end of the stem 15, prevents the return flow of any liquid, which may gain access to the interior of the dome, to the diffuser pipe 10 or supply main, when the air pressure fails.

It will be appreciated that in any of the above described examples of the invention it is a simple matter to clean the small air discharge orifice or port or ports 27 by removing the dome securing screw which, in effect, is a removable discharge orifice.

The present invention also facilitates removal of a dome when this becomes necessary because it is possible when the holding-down screw is removed to force the dome sideways and thus break the joint between it and the base plate.

I claim:

1. A diffuser for diffusing air into liquids comprising a diffuser pipe, a tubular stem having a screw threaded and open upper end and projecting from said pipe and in communication with the interior thereof for the flow of air or other gas from the diffuser pipe through the stem, a hollow dome having porous walls and a bolt hole in its crown-part and mounted on the diffuser pipe and over said stem, seal means between said dome and said diffuser pipe for sealing the mounting of said dome on said pipe in a substantially airtight manner, a screw threaded bolt having a tubular shank passing through said bolt hole in the crown of the porous dome and screwed onto said tubular stem so that it can be removed without disturbing said dome, and seal means between said dome and said bolt for closing the bolt hole in a substantially airtight manner, the tubular shank of the bolt having an orifice for the discharge of air from the tubular stem to the interior of the hollow porous dome.

2. A diffuser for diffusing air into liquids comprising a diffuser pipe, a tubular stem having a screw threaded and open upper end and projecting from said pipe and in communication with the interior thereof for the flow of air or other gas from the diffuser pipe through the stem, a hollow dome having porous walls and a bolt hole in its crown-part and mounted on the diffuser pipe and over said stem, seal means between said dome and said diffuser pipe for sealing the mounting of said dome on said pipe in a substantially airtight manner, a screw threaded bolt having a tubular shank passing through said bolt hole in the crown of the porous dome and screwed onto said tubular stem so that it can be removed without disturbing said dome, seal means between said dome and said bolt for closing the bolt hole in a substantially airtight manner, the tubular shank of the bolt having an orifice for the discharge of air from the tubular stem to the interior of the hollow porous dome, the tubular shank of the bolt also having an internal screw thread, and a screw threaded valve member screwed into said internal screw thread for adjusting the size of the orifice.

3. A diffuser for diffusing air into liquids comprising a diffuser pipe, a tubular stem having a screw threaded and open upper end and projecting from said pipe and in communication with the interior thereof for the flow of air or other gas from the diffuser pipe through the stem, a hollow dome having porous walls and a bolt hole in its crown-part and mounted on the diffuser pipe and over said stem, seal means between said dome and said diffuser pipe and sealing the mounting of said dome on said pipe in a substantially airtight manner, a screw threaded bolt having a tubular shank passing through said bolt hole in the crown of the porous dome and screwed onto said tubular stem so that it can be removed without disturbing said dome, seal means between said dome and said bolt for closing the bolt hole in a substantially airtight manner, the tubular shank of the bolt having an orifice for the discharge of air from the tubular stem to the interior of the hollow porous dome, and a non-return valve in the tubular shank of the bolt for preventing the flow of fluid from the interior of the dome, via the tubular shank of the bolt and the tubular stem, to the diffuser pipe.

ERIC PROCTER COOMBS.

References Cited in the file of this patent

UNITED STATES PATENTS

| Number | Name | Date |
|---|---|---|
| 1,154,507 | Gorton | Sept. 21, 1915 |
| 1,373,075 | Humphrey | Mar. 25, 1921 |
| 1,856,300 | Van Tuyl | May 3, 1932 |
| 1,920,719 | Stich | Aug. 1, 1933 |

FOREIGN PATENTS

| Number | Country | Date |
|---|---|---|
| 605,046 | Great Britain | July 15, 1948 |